United States Patent
Leopold

(10) Patent No.: US 11,850,920 B2
(45) Date of Patent: Dec. 26, 2023

(54) AIR VENT FOR A PASSENGER COMPARTMENT OF A MOTOR VEHICLE

(71) Applicant: fischer automotive systems GmbH & Co. KG, Horb a.N. (DE)

(72) Inventor: Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 42 days.

(21) Appl. No.: 17/831,476

(22) Filed: Jun. 3, 2022

(65) Prior Publication Data

US 2022/0396124 A1 Dec. 15, 2022

(30) Foreign Application Priority Data

Jun. 9, 2021 (DE) .................... 10 2021 114 875.8
Nov. 24, 2021 (DE) .................... 10 2021 130 825.9

(51) Int. Cl.
 *B60H 1/34* (2006.01)

(52) U.S. Cl.
CPC ... *B60H 1/3442* (2013.01); *B60H 2001/3478* (2013.01)

(58) Field of Classification Search
CPC .......... B60H 1/3442; B60H 2001/3478; B60H 1/3435; B60H 1/3414; B60H 2001/3471
See application file for complete search history.

(56) References Cited

U.S. PATENT DOCUMENTS 4,092,907 A * 6/1978 Meyer .................. F24F 13/065
454/154

FOREIGN PATENT DOCUMENTS

| CN | 1 11 452 596 A | 7/2020 |
| DE | 197 21 831 A1 | 11/1998 |
| DE | 100 64 432 A1 | 6/2002 |
| DE | 10 2004 003 059 A1 | 3/2006 |
| DE | 20 2014 002 057 U1 | 6/2015 |
| DE | 10 2018 002 322 A1 | 9/2019 |

OTHER PUBLICATIONS

Search Report for corresponding German Application No. 10 2021 114 879.0, dated Sep. 10, 2021.

* cited by examiner

*Primary Examiner* — Jessica Yuen
(74) *Attorney, Agent, or Firm* — Renner, Otto, Boisselle & Sklar, LLP

(57) ABSTRACT

A cage that can be rotated about a longitudinal axis and has a lattice tube shape is disposed in a tubular air channel of an air vent, serving as a carrier of an air guide device and an air volume control device.

12 Claims, 2 Drawing Sheets

AIR VENT FOR A PASSENGER COMPARTMENT OF A MOTOR VEHICLE

CROSS-REFERENCE TO RELATED APPLICATIONS

This application claims priority under 35 USC § 119 to German Patent Application Nos. 10 2021 114 875.8, filed Jun. 9, 2021, and 10 2021 130 825.9, filed Nov. 24, 2021, the entire disclosures of which are incorporated herein by reference.

TECHNICAL FIELD

The invention relates to an air vent for a passenger compartment of a motor vehicle.

DISCUSSION OF RELATED ART

Air vents for ventilating a passenger compartment of a motor vehicle are known. These typically comprise a tubular housing or an air channel, which is disposed in a recessed manner in an instrument panel, for example, or a center console of the motor vehicle and through which air flows into the passenger compartment. To be able to deflect an air stream exiting the air vent laterally to the left and right and toward the top and bottom, which is to say, generally speaking, in a two-dimensional manner, known air vents comprise pivotable blades, for example, serving as air guide elements.

The Chinese patent application CN 111 452 596 A discloses an air vent comprising an air guide grille that can be pivoted in a two-dimensional manner about the center thereof in a ball head-like manner and serves as an air guide element in an air outlet opening of the air vent. The air guide grille comprises blades that are disposed in a star-shaped/radially rigid manner in three circular rings concentrically enclosing one another. Pivoting the air guide grille in one direction causes an air current flowing through or out of the known air vent to be obliquely deflected in this direction to the side or toward the bottom or the top.

SUMMARY OF THE INVENTION

It is the object of the invention to provide an air vent for a motor vehicle that, for reasons of optics, does not comprise any movable air control elements in the region of an air outlet opening. "Air control elements" shall be understood to mean both air guide elements, which guide an air current flowing through the air vent, and air volume control elements, which control, and in particular restrict, the air volume flowing through the air vent. Whether intended or unintended, air guide elements can also act as air volume control elements, and vice versa.

The air vent according to the invention is intended for supplying an air current to a passenger compartment of a motor vehicle. The air vent is, for example, installed in a recessed manner into an instrument panel or a center console of the motor vehicle. The air vent according to the invention comprises an air channel and an air guide device, by way of which an air current flowing through the air channel can be deflected transversely to a direction of flow of the air current through the air channel. "Transversely" shall mean a deflection of the air current flowing through the air channel to a side, toward the top or bottom, obliquely at an angle with respect to a flow direction that the air current has without the deflection. The air channel, which can also form a housing of the air vent, is in particular tubular. In particular, this has a circular cross-section, but may also have an elliptical or oval, or otherwise round and/or angular, cross-section. In principle, a cross-sectional shape of the air channel of the air vent according to the invention is arbitrary, and preferably this is circular, as described. The described cross-sectional shape relates in particular to an inner cross-section, which is to say, an outline of a cross-sectional surface through which the air current flows through the air channel. On the outside, the air channel can have a different outline.

The air vent according to the invention comprises a carrier, which is disposed in the air channel and includes all elements, in particular all movable elements, of the air guide device. These are, for example, blades that are pivotably mounted in the carrier, or movable air guide elements configured otherwise, operating elements for manually pivoting or, generally speaking, adjusting the air guide elements, and transmission elements transmitting a movement of the operating element or operating elements to the air guide element or air guide elements. Together with the elements of the air guide device, the carrier forms an assembly that can be fully preassembled and, as a whole, be handled similarly to an individual part and that can be installed in the air channel or disposed in the air channel. In this way, it is possible to mount the carrier with the elements of the air guide device, independently of the air channel. The fully assembled carrier can, for example, subsequently be inserted into an existing air channel of a motor vehicle. All that is needed for this purpose is that the cross-sectional shape of the carrier and the cross-sectional shape of the air channel are matched to one another. The invention provides openings, for example to save material or to save weight, at or in a circumference of the carrier. The openings mean that the carrier does not have a circumferential wall that is closed in the circumferential direction and the flow direction, but such a circumferential wall of the carrier, if present, has the openings, or the openings take up a large part of a circumferential surface of the carrier and are enclosed, for example, by webs or rings and delimited with respect to one another. The openings can enable or facilitate access to the elements of the air guide device.

An embodiment of the invention provides a carrier comprising circumferential rings, which are disposed at a distance one behind the other in the direction of flow of the air current through the air channel, and, for example, rod-shaped or strip-shaped connectors rigidly connecting the rings. The connectors can extend in the flow direction or, for example, these can also extend obliquely with respect to the flow direction, or helically. The rings and the connectors form a kind of cage having an, in particular tubular, lateral surface, wherein the rings and the connectors enclose the openings of the carrier and delimit these with respect to one another. The lateral surface is an imaginary surface that encloses the rings and the connectors of the carrier and that, between the rings, has a curvature corresponding to the rings. The lateral surface does not extend beyond the end faces of the carrier. The rings and the connectors essentially form edges of the openings. The rings and the connectors preferably rest against the inside of the air channel of the air vent.

The openings at the circumference of the carrier are large, and these are not just simply bearing holes or similarly small holes in the circumference of the carrier. Together, the openings at or in the circumference of the carrier in particular take up more than half, and preferably at least 80%, or at least 90%, of the lateral surface of the carrier.

In a preferred embodiment of the invention, the carrier, together with the elements of the air guide device, is disposed in the air channel so as to be rotatable about a longitudinal axis extending in the direction of flow of the air current through the air channel. In this embodiment of the invention, the air channel preferably has a circular cross-section, and the rings of the carrier are in particular likewise circular. In particular, a kind of sliding fit is created between the carrier and the air channel, whereby the carrier is mounted in a stable manner in the air channel, while still being easily rotated about the longitudinal axis with respect to the air channel. In the case of a straight air channel, the longitudinal axis is a straight line through centers or centroids of the cross-sections of the air channel. In the case of a non-straight air channel, the longitudinal axis is a straight line through centers or centroids of two selected cross-sections of the air channel that are arranged at a distance from one another in the direction of flow of the air current through the air channel, or a tangent of a line through the centers or centroids of the cross-sections of the air channel at a selected cross-section of the air channel. The rotatability of the air guide device, together with the carrier, in the air channel allows the flow through the air channel to be deflected in any arbitrary direction using only one air guide element, such as a blade, by rotating the carrier in the air channel and pivoting the air guide element to the side, toward the top or toward the bottom.

According to a refinement of the invention, as mentioned, the air channel forms a sliding bearing for the carrier that can be rotated about the longitudinal axis and is slidably mounted in the air channel. For example, the rings and/or the connectors rest against the inside of the air channel so as to be capable of sliding in the circumferential direction.

An embodiment of the invention provides an air control element that can be pivoted about a transverse axis extending transversely to the direction of flow of the air current through the air channel. In particular, the air control element can be pivoted about a transverse axis extending radially through the air channel. In particular, the transverse axis is oriented perpendicularly to the longitudinal axis. The air control element is pivotably mounted at or in the carrier of the air vent by way of a pivot mounting. The air control element can be an air guide element, for example a blade that can be pivoted about the transverse axis. The air control element can also be an air volume control element, for example a damper that can be pivoted about the transverse axis. An air vent comprising one or more air guide elements and one or more air volume control elements is also possible. For example, multiple air guide elements can be disposed one behind the other in the direction of flow through the air vent and, as seen in the flow direction, so as to intersect each other in the air channel or in the carrier.

The air control element can be movable by way of external power, for example electromechanically. The invention preferably provides for a manual movement of the air guide device or of the air control element or elements. An embodiment of the invention provides a lever gear mechanism or a pinion gear mechanism, in particular a bevel gear mechanism, for driving the air control element or elements. Different types of gears may be combined with one another. The air guide device can comprise one gear mechanism for each air control element, whereby the air control elements can be remotely operated manually, for example, from the region of an air outlet.

So as to restrict the air current flowing through the air channel of the air vent, an embodiment of the invention provides a restrictor, the elements of which are disposed at or in the carrier. The restrictor, for example, comprises a damper, a damper slide or, generally speaking, an air volume control element.

In particular for guiding the air current, an embodiment of the invention provides a circumferential constriction of the air channel at a distance of no more than half the mean transverse diameter of the narrowest flow cross-section of the air channel in the direction of flow of the air current through the air channel, up to the air outlet opening, upstream from the air outlet opening of the air channel or of the air vent. In the case of a circular cross-section of the air channel, the mean transverse diameter is the diameter. In the case of a non-circular cross-section, the transverse diameter has to be averaged or a suitable transverse diameter has to be selected. From the narrowest point of the constriction, the flow cross-section of the air channel remains constant, or increases, up to the air outlet opening of the air channel.

For optical reasons, according to a preferred embodiment of the invention, no air control element in the direction of flow of the air current through the air channel is situated closer than half the mean transverse diameter of the narrowest flow cross-section of the air channel at the air outlet opening. As a result, the movable air guide element is, or the movable air guide elements are, not visible, or barely visible, through the air outlet opening from the passenger compartment.

For remotely controlling a first air control element, which is disposed upstream from a second air control element in the direction of flow through the air channel of the air vent, an embodiment of the invention provides a through-opening for a drive element in the second air control element. "Remotely controlling" means, in particular, manually moving the first air control element, from a side of the second air control element which faces away from the first air control element. The drive element can be a rotatable shaft or a pivotable lever, for example. The through-opening can, for example, be a hole, an elongated hole, or a slot, for example in an axial plane or in a plane that is parallel to the axial plane.

The features and feature combinations, embodiments and configurations of the invention mentioned above in the description, and the features and feature combinations mentioned hereafter in the description of the figures and/or shown in a figure, can be used not only in the respective indicated or illustrated combination, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment, but an essentially arbitrary portion of the characterizing features of an exemplary embodiment, are possible.

BRIEF DESCRIPTION OF THE DRAWINGS

The invention will be described hereafter in greater detail based on one exemplary embodiment shown in the drawings. In the drawings.

DETAILED DESCRIPTION

Figure 1:
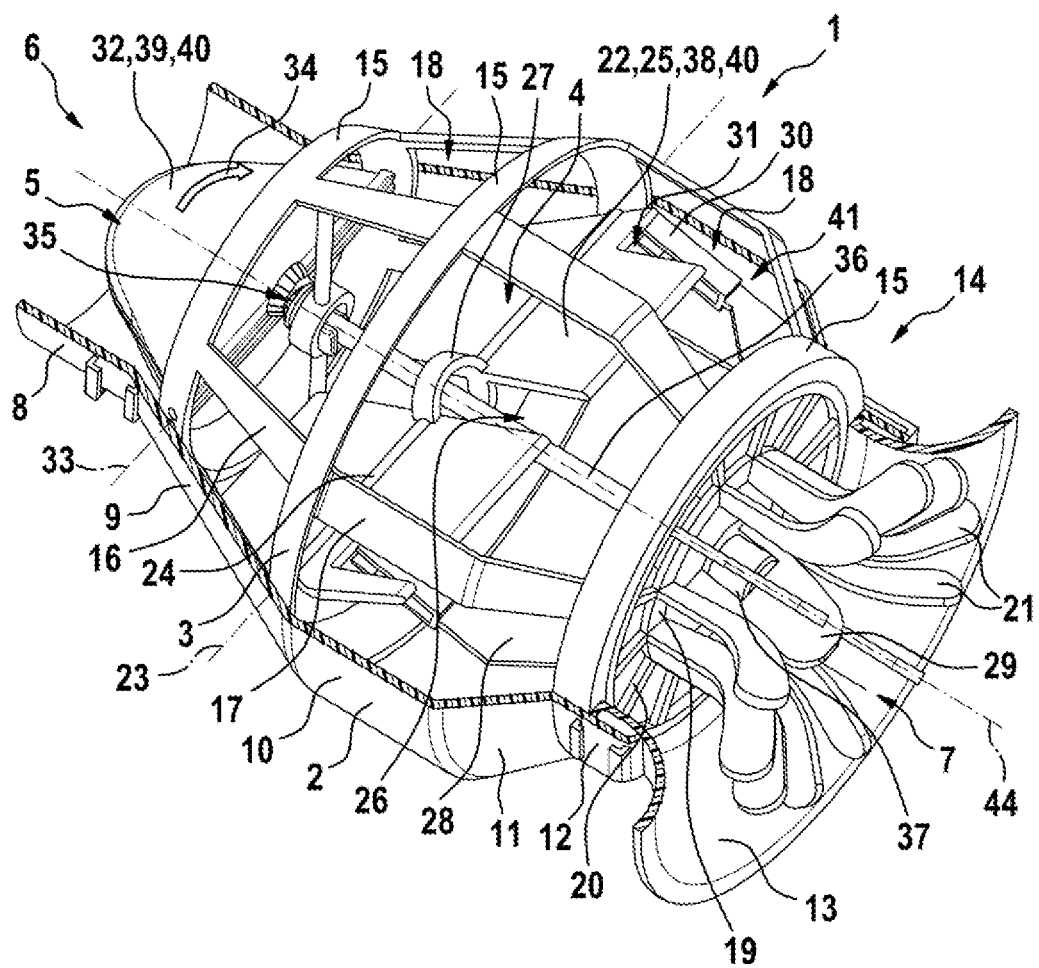
FIG. 1 shows a perspective illustration of an air vent according to the invention, including an air channel, in an axial section.

The air vent 1 according to the invention shown in FIG. 1 includes an air channel 2 in which a carrier 3 is disposed, which includes all elements of an air guide device 4 and, in the exemplary embodiment, of an air volume control device 5. The air channel 2 is shown in an axial section in FIG. 1 so that the carrier 3 including the air guide device 4 and the air volume control device 5 is visible. The air vent 1 is used to supply air to a passenger compartment of a motor vehicle, which is not shown, and is preferably disposed in a recessed manner, for example in an instrument panel or a center console of the motor vehicle.

The air channel 2 is tubular and has a circular cross-section in the exemplary embodiment. This may also be interpreted as a housing of the air vent 1. Proceeding from an air inlet opening 6 to an air outlet opening 7, the air channel 2 comprises a first cylindrical tube-shaped section 8, which is adjoined by a first frustum-shaped section 9, which expands in a direction of flow through the air channel 2, which is to say in the direction from the air inlet opening 6 to the air outlet opening 7. A second cylindrical tube-shaped section 10 adjoins the first frustum-shaped section 9 and is adjoined by a second frustum-shaped section 11, which tapers in the flow direction. A third cylindrical tube-shaped section 12 adjoins the second frustum-shaped section 11 and is adjoined by a trumpet-shaped mouth funnel 13, which encloses the air outlet opening 7 of the air channel 2. The mouth funnel 13 is annular and has a convex annular cross-section, which expands in the flow direction. The second frustum-shaped section 11, the third cylindrical tube-shaped section 12 and the mouth funnel 13 form a circumferential constriction 14 of the air channel 2 close to the air outlet opening 7. The third cylindrical tube-shaped section 12 forms the narrowest flow cross-section of the circumferential constriction 14, the axial distance of which with respect to the air outlet opening 7 is not greater than half the diameter thereof.

The carrier 3 comprises several, three in the exemplary embodiment, circular rings 15, which are disposed in the radial plane of the air channel 2 in the air channel 2. The rings 15 of the carrier 3 are disposed at a distance, one behind the other, in the direction of flow through the air channel 2. In a longitudinal direction of the air channel 2 or of the air vent 1, the rings 15 are rigidly connected by connectors 16. "Longitudinal direction" shall be understood to mean a direction along a longitudinal axis 44 of the air channel 2, or of the carrier 3, of the air vent 1. In the exemplary embodiment, the connectors 16 are strip-shaped and disposed in axial planes of the air channel 2. Likewise in the exemplary embodiment, the connectors 16 are disposed on the inside of the air channel 2, and in the direction of flow through the air channel 2 the connectors 16 in the frustum-shaped section 8, 10, similarly to the frustum-shaped section 8, 10, extend obliquely away from one another or obliquely toward one another, and in the second cylindrical tube-shaped section 10 the connectors 16 of the carrier 3 extend in a substantially axially parallel manner.

The rings 15 and the connectors 16 of the carrier 3 form a tubular cage 17, wherein the rings 15 and the connectors 16 enclose openings 18 at a circumference of the carrier 3 and delimit these with respect to one another. The rings 15 and the connectors 16 are narrow and have large distances with respect to one another in the longitudinal direction and in a circumferential direction, so that the openings 18 between the rings 15 and the connectors 16 have large surface areas. These take up more than half a lateral surface of the carrier 3, wherein the lateral surface is an imaginary tubular surface that encloses the tubular cage 17 formed by the rings 15 and the connectors 16 and that has circular cross-sections. The lateral surface leaves end faces of the cage 17 open. The openings 18 at the circumference of the cage 17 forming the carrier 3 preferably take up at least 80% or at least 90% of the lateral surface of the cage 17.

A last one of the rings 15 of the cage 17 forming the carrier 3 of the air vent 1 according to the invention, which in the exemplary embodiment is located in the third cylindrical tube-shaped section 12, which is to say in the narrowest flow cross-section of the circumferential constriction 14 of the air channel 2, comprises a concentric inner ring 19, which is connected to the last ring 15 of the carrier 3 by ribs 20 that are disposed in a star-shaped or radial manner. From the inner ring 19, fixed guide vanes 21 project into the air outlet opening 7 in the mouth funnel 13 of the air channel 2. The guide vanes 21 are disposed in axial planes of the air channel 2 or of the carrier 3 and, as viewed from a side onto the respective guide vane 21, have a hockey stick-like shape, and extend in the convexly expanding mouth funnel 13 in a radially outwardly curved manner. In a center between the guide vanes 21, an imaginary, cylindrical central region having a diameter corresponding to an inside diameter of the inner ring 19 is clear.

The air channel 2 forms a sliding bearing for the carrier 3, which is slidably mounted in the air channel 2 so as to be rotatable about the longitudinal axis 44. The air channel 2 essentially forms an outer ring of the sliding bearing in which the rings 15 of the carrier 3, serving as inner rings of the sliding bearing, are slidably mounted so as to be rotatable about the longitudinal axis 44.

Figure 2:
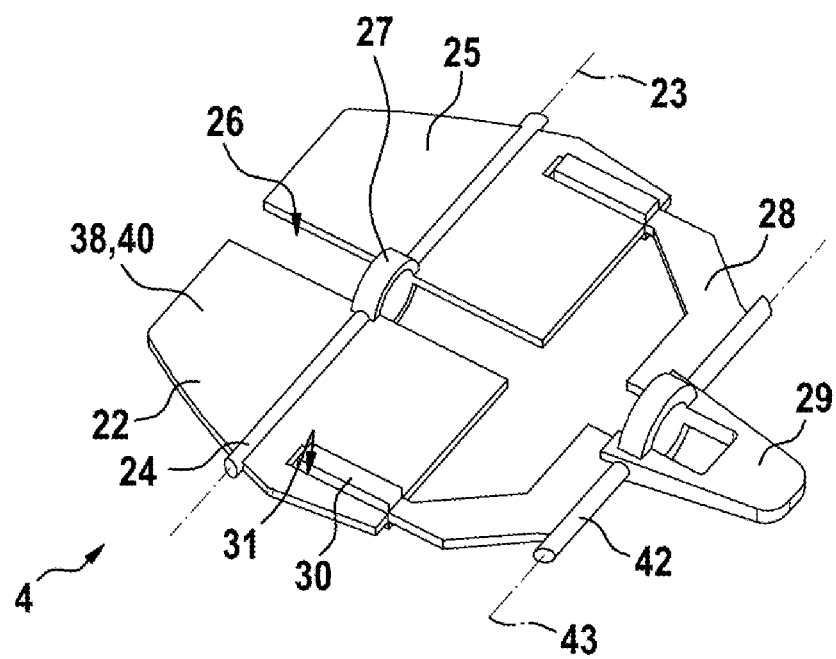
FIG. 2 shows elements of an air guide device of the air vent from FIG. 1.

FIG. 2 shows the elements of the air guide device 4 accommodated in the carrier 3. The air guide device 4 comprises a strip-shaped blade 22, which extends transversely through the carrier 3 and which can be pivoted about a first transverse axis 23 that extends radially through the air channel 2 and the carrier 3. The first transverse axis 23 is oriented perpendicularly to the longitudinal axis 44. The blade 22 includes a shaft 24 that is coaxial to the transverse axis 23 thereof and that is a single-piece integral component of the blade 22 and protrudes beyond the blade 22 toward the outside on both sides. Ends of the shaft 24 that protrude laterally beyond the blade 22 are rotatably mounted in bearing holes in one of the rings 15 of the tubular cage 17 forming the carrier 3. The bearing holes and the ends of the shaft 24 rotatably mounted therein form a pivot mounting for the blade 22.

By pivoting the blade 22 about the first transverse axis 23, the air current flowing through the air channel 2 of the air vent 1 according to the invention can be guided obliquely to the side. As a result of the rotation of the cage 17 forming the carrier 3 about the longitudinal axis 44 of the air channel 2 and of the carrier 3, it is possible to set a direction in which the air current flowing through the air channel 2 can be obliquely guided to the side.

The blade 22 is disposed at a distance in the direction of flow through the air channel 2, upstream from the air outlet opening 7, which is approximately as large as an inside diameter of the constriction 14, so that the blade 22 is not or barely visible from the passenger compartment of the motor vehicle through the mouth funnel 13 of the air channel 2.

The blade 22 is divided in the center into two semi-blades 25 and has a longitudinal slot 26 in an axial plane of the air channel 2 and of the carrier 3. The two semi-blades 25 are connected to one another by a ring 27 that is integral therewith.

For pivoting or, generally speaking, moving the blade 22, the air vent 1 according to the invention comprises a fork-like operating element 28, which is likewise mounted in bearing holes in one of the rings 15 of the carrier 3 so as to be pivotable about a second transverse axis 43 by way of a shaft 42. The second transverse axis 43 is likewise oriented perpendicularly to the longitudinal axis 44. In the direction of flow through the air vent 1, the operating element 28 is pivotably mounted in a ring 15 behind the ring 15 in which the blade 22 is pivotably mounted.

In a center of the operating element 28, an operating tab 29 protrudes in the direction of flow through the air vent 1 and extends to between the guide vanes 21. For pivoting, the operating tab 29 can be gripped by a vehicle occupant using two fingers.

Two fingers 30 of the fork-shaped operating element 28 protrude into axially parallel slots 31 in the two semi-blades 25, wherein the two fingers 30 are likewise furcated and extend across shafts 42, which are not visible in the drawing and which extend across the slots 31 in the semi-blades 25, so that the fingers 30 of the operating element 28 are pivotably connected to the two semi-blades 25 of the blade 22. The blade 22 is pivoted by pivoting of the operating element 28. The two fingers 30 of the operating element 28 can be interpreted as lever gear mechanisms 41 for pivoting or, generally speaking, for moving or for driving the blade 22.

Two dampers 32 are disposed between the air inlet opening 6 and the blade 22, which are mounted in one of the rings 15 of the cage 17 forming the carrier 3 so as to be pivotable about a shared third transverse axis 33. The transverse axis 33 likewise extends radially through the ring 15 or the cage 17 and the air channel 2. The third transverse axis 33 is oriented perpendicularly to the longitudinal axis 44. So as to restrict the air current flowing through the air channel 2, the two dampers 32 can be pivoted from a position shown in FIG. 1, in which the two dampers 32, resting against one another, are situated on both sides at an axial plane of the channel 2 and of the carrier 3, as is illustrated by the arrow 34 for one of the two dampers 32, into a V-shaped position, as viewed radially with respect to the air channel 2 and with respect to the carrier 3.

The two dampers 32 can be jointly pivoted in opposite directions by way of a bevel gear mechanism 35. The bevel gear mechanism 35 is rotatably mounted in a center of the ring 15 of the cage 17 in which the dampers 32 are rotatably mounted. Rotary driving of the bevel gear mechanism 35 for pivoting the two dampers 32 apart and together is achieved by way of a shaft 36, which is disposed coaxially in the cage 17 and the air channel 2 and which comprises a turning knob 37 in a recess in the operating tab 29 of the operating element 28. Similarly to the operating tab 29, the turning knob 37 is situated between the guide vanes 21 and is accessible from the passenger compartment of the motor vehicle. The shaft 36 of the dampers 32 extends through the longitudinal slot 26 that divides the blade 22 into the two semi-blades 25, and passes through the connecting ring 27. The longitudinal slot 26 and the ring 27 can, generally speaking, also be interpreted as a through-opening of the blade 22, and the shaft 36 can also be interpreted as a drive element for remotely controlling the dampers 32 by way of the turning knob 37 in the mouth funnel 13.

The two dampers 32 form the air volume control device 5. The air guide device 4 and the air volume control device 5 can, generally speaking, also be interpreted as air control devices, by way of which the air current flowing through the air vent 1 can be guided and an air volume can be controlled, namely restricted. Accordingly, the blade 22 can be interpreted as an air guide element 38, and the dampers 32 can be interpreted as air volume control elements 39. In summary, the blades 22 and the dampers 32 can be interpreted as air control elements 40. All elements of the air guide device 4 and of the air volume control device 5, and thus also all elements of the air control device, are mounted, disposed, or contained in the carrier 3. Together with the air control device, which is to say together with the air guide device 4 and the air volume control device 5, the carrier 3 forms a self-contained assembly.

LIST OF REFERENCE SIGNS

Air Vent for a Passenger Compartment of a Motor Vehicle

1 air vent
2 air channel
3 carrier
4 air guide device
5 air volume control device
6 air inlet opening
7 air outlet opening
8 first cylindrical tube-shaped section
9 first frustum-shaped section
10 second cylindrical tube-shaped section
11 second frustum-shaped section
12 third cylindrical tube-shaped section
13 mouth funnel
14 constriction
15 ring
16 connector
17 cage
18 opening
19 inner ring
20 rib
21 guide vane
22 blade
23 first transverse axis
24 shaft of the blade 22
25 semi-blade
26 longitudinal slot
27 ring
28 operating element
29 operating tab
30 finger
31 slot
32 damper
33 third transverse axis
34 arrow
35 bevel gear mechanism
36 shaft of the dampers 32
37 turning knob
38 air guide element
39 air volume control element
40 air control element
41 lever gear mechanism
42 shaft of the operating element 28
43 second transverse axis
44 longitudinal axis

The invention claimed is:

1. An air vent for a passenger compartment of a motor vehicle, comprising an air channel and an air guide device, by way of which an air current flowing through the air channel can be deflected transversely to a direction of flow of the air current through the air channel, the air vent comprising a tubular or an annular carrier for the air guide device, which is disposed in the air channel and includes all elements of the air guide device, wherein the carrier includes openings at the circumference thereof;

wherein the carrier comprises a tubular cage comprising circumferential rings which are disposed at a distance, one behind the other, in the direction of flow of the air current through the air channel, and connectors which rigidly connect the circumferential rings, and the circumferential rings and the connectors define openings between the circumferential rings and the connectors.

2. The air vent according to claim 1, wherein the sum of the surfaces of the openings of the carrier is greater than half a lateral surface of the carrier.

3. The air vent according to claim 1, wherein the carrier, together with the air guide device, can be rotated in the air channel about a longitudinal axis extending in the flow direction.

4. The air vent according to claim 3, wherein the air channel forms a sliding bearing for the carrier, which mounts the carrier rotatably about the longitudinal axis.

5. The air vent according to claim 1, wherein the air guide device comprises an air control element, which can be pivoted about a transverse axis extending transversely to the direction of flow of the air current through the air channel, and that the carrier has a pivot mounting for the air control element.

6. The air vent according to claim 5, wherein the air guide device can be manually driven for pivoting the air control element, and/or that the air guide device comprises a lever gear mechanism or a pinion gear mechanism for pivoting the air control element.

7. The air vent according to claim 5, wherein the air guide device comprises a bevel gear mechanism for pivoting the air control element.

8. The air vent according claim 1, wherein the air vent comprises an air volume control device for the air current, by way of which the air current flowing through the air channel can be restricted, and that the carrier also includes all elements of the air volume control device.

9. The air vent according to claim 1, wherein the air channel includes a circumferential constriction at a distance of no more than half the mean transverse diameter of the narrowest flow cross-section of the air channel in the direction of flow of the air current through the air channel, upstream from an air outlet opening of the air channel, and starting from the circumferential constriction the flow cross-section of the air channel remains constant or increases up to the air outlet opening.

10. The air vent according to claim 1, wherein no air control element in the direction of flow of the air current through the air channel is present closer than half the mean transverse diameter of the narrowest flow cross-section of the air channel at the air outlet opening of the air channel.

11. The air vent according to claim 1, wherein the air channel has a circular inner cross-section, and the circumferential rings of the carrier are circular.

12. The air vent according to claim 1, wherein an air control element has a through-opening for a drive element for remotely controlling the air control element, and that the drive element is guided through the through-opening of the air control element.

* * * * *